(12) United States Patent
Lockman, III et al.

(10) Patent No.: US 11,971,990 B2
(45) Date of Patent: Apr. 30, 2024

(54) SYSTEM AND METHOD FOR CONTAINER VALIDATION

(71) Applicant: Dell Products L.P., Round Rock, TX (US)

(72) Inventors: John A. Lockman, III, Granite Shoals, TX (US); Onur Celebioglu, Austin, TX (US); Lucas A. Wilson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 378 days.

(21) Appl. No.: 17/575,398

(22) Filed: Jan. 13, 2022

(65) Prior Publication Data

US 2023/0222218 A1    Jul. 13, 2023

(51) Int. Cl.
| | | |
|---|---|---|
| *G06F 21/57* | (2013.01) | |
| *G06F 8/60* | (2018.01) | |
| *H04L 9/32* | (2006.01) | |
| *H04L 9/00* | (2022.01) | |

(52) U.S. Cl.
CPC ............. *G06F 21/57* (2013.01); *G06F 8/60* (2013.01); *H04L 9/3247* (2013.01); *G06F 2221/033* (2013.01); *H04L 9/50* (2022.05)

(58) Field of Classification Search
CPC ...................................................... G06F 21/57
See application file for complete search history.

(56) References Cited

U.S. PATENT DOCUMENTS

| | | | |
|---|---|---|---|
| 6,442,564 B1 | 8/2002 | Frey et al. | |
| 10,261,782 B2 * | 4/2019 | Suarez | ............ G06F 8/63 |
| 2011/0126275 A1 | 5/2011 | Anderson et al. | |
| 2016/0381075 A1 * | 12/2016 | Goyal | ............ G06F 21/64 |
| | | | 713/176 |
| 2018/0150330 A1 | 5/2018 | Bernat et al. | |
| 2019/0354382 A1 * | 11/2019 | Ross | ............ G06F 9/44505 |
| 2019/0354403 A1 | 11/2019 | Ayyagari et al. | |
| 2021/0034423 A1 | 2/2021 | Hallur et al. | |

(Continued)

OTHER PUBLICATIONS

Gkikopoulos, Panagiotis & Schiavoni, Valerio & Spillner, Josef. (Jun. 9, 2021). Analysis and Improvement of Heterogeneous Hardware Support in Docker Images. In: Matos M., Greve F. (eds) Distributed Applications and Interoperable Systems. DAIS 2021. Lecture Notes in Computer Science, vol. 12718. Springer, Cham. https://doi.org/10.1007/978-3-030-78198-9_9.

(Continued)

*Primary Examiner* — Bradley W Holder

(74) *Attorney, Agent, or Firm* — Womble Bond Dickinson (US) LLP

(57) ABSTRACT

Methods and systems for managing the performance of workloads in a distributed system are disclosed. The distributed system may include any number of clients and deployments where workloads may be performed. The workloads may be performed by deploying container instances to the deployments. The container instances may perform the workload when deployed. It may be challenging to ascertain whether a container instance, container image on which the instance is based, and/or corresponding build file used to obtain the container image should be trusted. Metadata block chains may be used to ascertain whether container instances should be deployed to service the workload requests.

20 Claims, 9 Drawing Sheets

(56) References Cited

U.S. PATENT DOCUMENTS

2022/0124009 A1      4/2022  Metsch et al.
2023/0037616 A1 *    2/2023  Karri ...................... G06F 21/53

OTHER PUBLICATIONS

"Getting Started with Docker," Web page <https://www.docker.com/get-started>, 1 page, Dec. 31, 2021, retrieved from Internet Archive Wayback Machine <http://web.archive.org/web/20211231094517/https://www.docker.com/get-started> on Jan. 20, 2022.

* cited by examiner

SYSTEM AND METHOD FOR CONTAINER VALIDATION

FIELD OF THE DISCLOSED EMBODIMENTS

Embodiments disclosed herein relate generally to workload management. More particularly, embodiments disclosed herein relate to systems and methods for servicing workload requests using container instances.

BACKGROUND

Computing devices may store data and used stored data. For example, computing devices may utilize data when providing computer implemented services. The ability of computing devices to perform different types of computer implemented services may depend on the types and quantities of available computing resources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
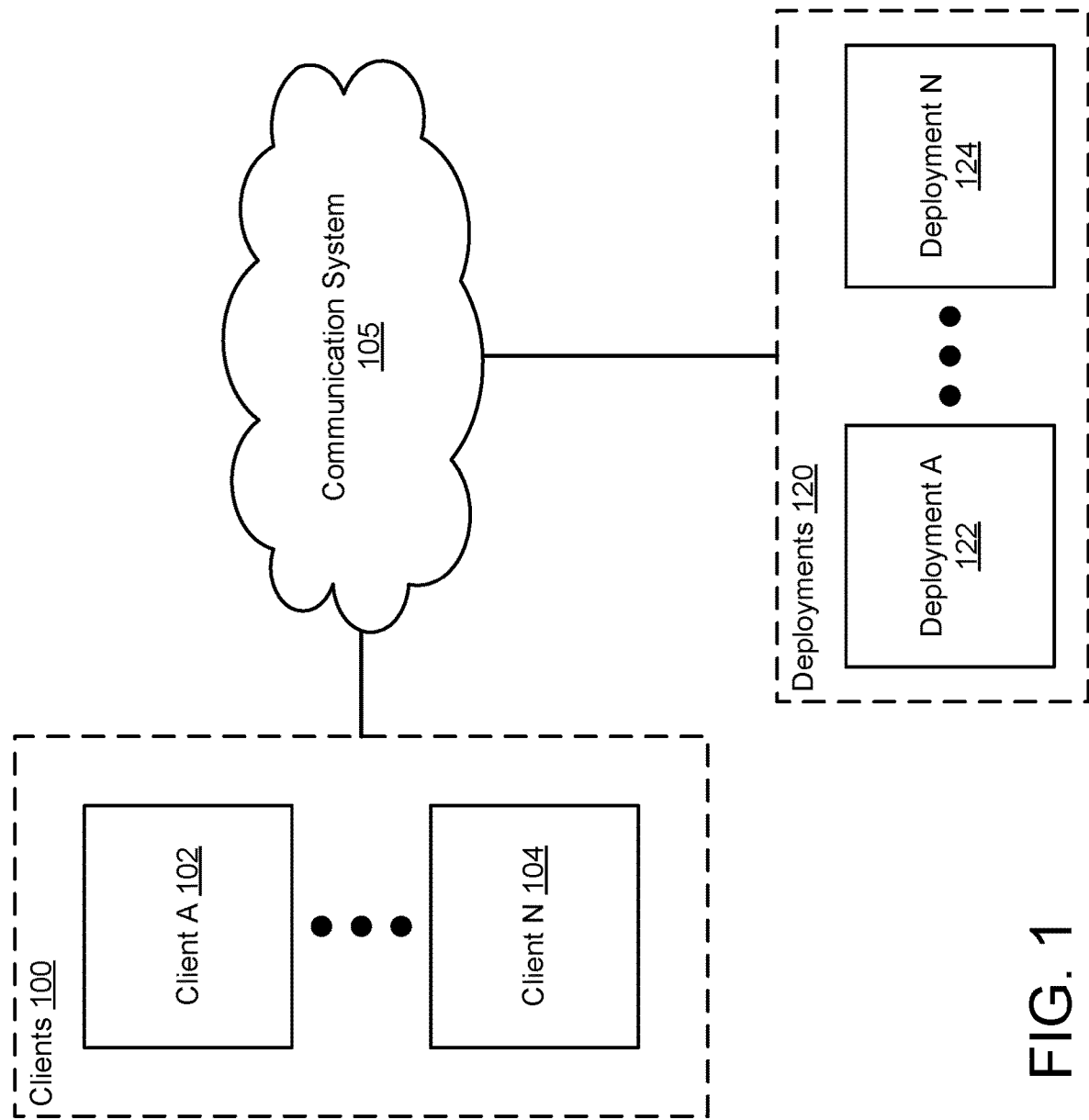
FIG. 1 shows a block diagram illustrating a system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing the performance of workloads in a distributed system. The distributed system may include any number of clients and deployments where workloads may be performed. The workloads may be performed by deploying container instances to the deployments. The container instances may perform the workload when deployed.

However, it may be difficult to ascertain whether a container instance, container image on which the instance is based, and/or corresponding build file used to obtain the container image should be trusted. Build files may include any number of layers which may automatically cause any number of applications to be added to a container image. Consequently, any of the applications may perform actions not desired by a person desiring that a workload be performed.

To reduce the complexity of analyzing build files and/or container images for their respective functionalities, embodiments disclosed herein may provide a method of establishing an envelope of trust for certain build files. The trust envelope may be implemented with metadata blocks chained to form immutable data structures that may be validated. Each of the metadata blocks may include information indicating the entity that added a corresponding layer to a build file. If all of the metadata blocks indicate that all of the layers were added by trusted entities, then the corresponding build file and/or container image may be trusted.

To prevent the metadata blocks from being tampered with or otherwise manipulated to indicate deployment of container instances that may perform undesired actions, the metadata blocks may be chained to one another to form a metadata block chain. Consequently, the metadata blocks may be both validated as being authentic and used to ascertain whether a build file and corresponding container image should be trusted.

By doing so, embodiments disclosed herein may reduce the likelihood of container instances that cause undesired actions to be performed. Thus, embodiments disclosed herein may provide a distributed system that is better able to operate even in the face of intention actions by third party attackers.

In an embodiment, a computer-implemented method for managing workloads to be performed using deployments is provided. The method may include obtaining a new workload request for a workload to be performed with a data processing system of the deployments and a build file; making a determination that layer-level metadata blocks associated with the build file indicate that all of the layers of the build file are authentic; based on the determination: making a second determination that the layer-level metadata blocks associated with the build file indicate that all of the layers of the build file are trusted; based on the second determination: deploying a container instance associated with the build file to a deployment of the deployments to service the workload request.

Each of the layer-level metadata blocks corresponds to a layer of the build file, an ordering of the layer-level metadata blocks corresponding to an ordering of the layers of the build file, and the layer-level metadata blocks are stored as an immutable block chain.

Making the determination may include verifying that that chaining of each of the layer-level metadata blocks indicates that none of the layer-level metadata blocks have been altered.

One of the layer-level metadata blocks includes an identifier of an entity that added the layer to the build file, wherein making the second determination comprises comparing the identifier of the entity to a list of identifiers of trusted entities to determine that the entity is trusted.

One of the layer-level metadata blocks further includes a cryptographic fingerprint, wherein making the second determination further comprises authenticating the one of the layer-level metadata blocks as being from the identified entity using the cryptographic fingerprint.

The cryptographic fingerprint may be generated using a trusted platform module of a data processing device operated by the entity that added the layer to the build file.

One of the layer-level metadata blocks may further include information regarding an associated layer of the build file, the layer defining one or more actions to be performed to generate, in part, a container image corresponding to the build file, wherein information regarding the associated layer indicates one or more commands invoked by the layer when generating the container image.

The computer-implemented method may also include prior to obtaining the workload request: obtaining a second build file; adding a layer to the second build file to obtain the build file; generating a layer-level metadata block corresponding to the added layer; chaining the layer-level metadata block to second layer-level metadata blocks associated with the second build file to obtain the layer-level metadata blocks.

Generating the layer-level metadata block may include adding: an identifier of an entity that added the layer to the second build file to a new layer-level metadata block; information regarding actions specified by the layer; and a cryptographic signature associated with the entity.

Chaining the layer-level metadata block to the second layer-level metadata blocks may include generating a second cryptographic signature of a most recently added layer-level metadata block of the second layer-level metadata blocks; and adding the second cryptographic signature to the layer-level metadata block.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to, one or more clients 100, one or more deployments 120, and a communication system 105 that facilitates operable connections between all, or a portion, of the components illustrated in FIG. 1. Each of these components is discussed below.

All, or a portion, of clients 102-104 may facilitate deployment of workloads thereby causing computer-implemented services to be provided. The computer implemented services may include any type and quantity of services including, for example, database services, instant messaging services, video conferencing services, etc.

To provide these services, one or more of clients 100 may obtain information (e.g., workload requests) regarding workloads to be performed. The information may be obtained, for example, from users of clients 100 or from other devices. Clients 100 may service the workload requests by facilitating deployment of the workloads to one or more of deployments 120.

In an embodiment, the workload requests are serviced by deploying container instances to deployments 120. For example, any of deployments 120 may be adapted to host instances of containers. To do so, deployments 120 may provide for operating system (OS) level virtualization. Container instances (e.g., user space instances) may be hosted and share the services provided by the virtualized operating system. The virtualized operating system may mediate presentation of and access to various resources of the host deployment. The applications and data in each of the hosted container instances may be segregated from one another and not be able to interact with one another.

To deploy an instance of a container, a build file may be utilized. The build file may specify any number of actions (e.g., layers) to be performed to obtain an image which may include all of the dependencies, libraries, and/or other data structures necessary for applications and other entities in the image to appropriately execute within a container instance. The image of the container may be used to deploy an instance of the container. For example, a copy of the contents of the image of the container may be stored (e.g., which may be stored in a read-only format) in the user space associated with the container instance. Additional, some amount of writable space may be available within the container instance which may be used to facilitate execution of applications, storage of changes to data (e.g., due to application execution) in the container instance over time, and/or used for other functions.

Various resources used to obtain copies of images may be obtained from various entities (e.g., local and/or remote). When a build file is used to obtain an image, any number of the resources (e.g., binary executables, dependencies, software libraries, configuration files, etc.) may be obtained and combined to obtain the image. For example, the build file may include any number of actions that when performed cause various resources to be obtained, aggregated, and/or otherwise processed to obtain a corresponding container image.

Deployments 120 may include any number of data processing devices that may be used to host container instances. As noted above, deployments 120 may host appropriate OS level virtualization services and/or other management entities such that any number of container instances may be deployed to deployments 120. Each of the deployments (e.g., 122, 124) may include any number of data processing devices that may independently or cooperatively host container instances.

However, sources of build files and container images may not be readily apparent. For example, the build files and container images may not include information usable to identify whether a trusted or an untrusted entity generated a build file. Thus, if a container image is used to deploy a container instance that is actually from a malicious party, execution of the container instance may result in, for example, data loss, data pollution, unauthorized party access to the deployments, and/or other undesirable outcomes.

Further, it may not be readily apparent from a build file or container image whether either has been modified. Thus, even if, for example, a build file included information regarding an entity that created the build file, the build file could be modified to cause different container images from that expected to be produced with the build file. Consequently, another party could use a build file or container image to induce authorization (e.g., by an authorized person) of execution of a malicious container instance on a deployment or other computing device.

In general, embodiments disclosed herein relate to systems, methods, and devices for managing the deployment of workloads using container instances. To manage the deployment of workloads, the container instances may be subjected to validation and/or authentication (e.g., to determine whether the container instance is from a trusted or untrusted entity) prior to deployment.

To manage authentication and/or validation of container instances, metadata blocks corresponding to each layer of a build file may be generated and chained to form an immutable data structure. These metadata blocks may be used to determine whether a build file and/or corresponding container image should be used to instantiate a container instance (e.g., even when a workload request indicates that a container instance of the container image should be instantiated).

By doing so, a system in accordance with embodiments disclosed herein may reduce the likelihood of undesired operation of container instances. For example, a system in accordance with embodiments disclosed herein may be more likely to prevent container instances from executing that may otherwise impair the operation of a data processing system.

Deployments 120 may perform workloads in cooperation with clients 100. To do so, deployments 120 may deploy instances of containers. Clients 100 may indicate when such containers instances are to be deployed and to where the container instances are to be deployed. Deployments 120 may host infrastructure such as virtualized operating systems to facilitate hosting of any number of container instances. Container instances may be deployed to any number of deployments (e.g., 122, 124).

Any of clients 100 and deployments 120 may be implemented using a data processing system (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 7. For additional details regarding clients 100, refer to FIG. 2A.

In an embodiment, communication system 105 includes one or more networks that facilitate communication between all, or a portion, of clients 100 and deployments 120. To provide its functionality, communication system 105 may be implemented with one or more wired and/or wireless networks. Any of these networks may be private, public, and/or may include the Internet. For example, clients 100 may be operably connected to one another via a local network which is operably connected to the Internet. Similarly, deployments 120 may be operably connected to one another via a second local network which is also operably connected to the Internet thereby allowing any of clients 100 and deployments 120 to communication with one another and/or other devices operably connected to the Internet. Clients 100, deployments 120, and/or communication system 105 may be adapted to perform one or more protocols for communicating via communication system 105.

While illustrated in FIG. 1 as included a limited number of specific components, a system in accordance with an embodiment may include fewer, additional, and/or different components than those illustrated therein.

Figure 2A:
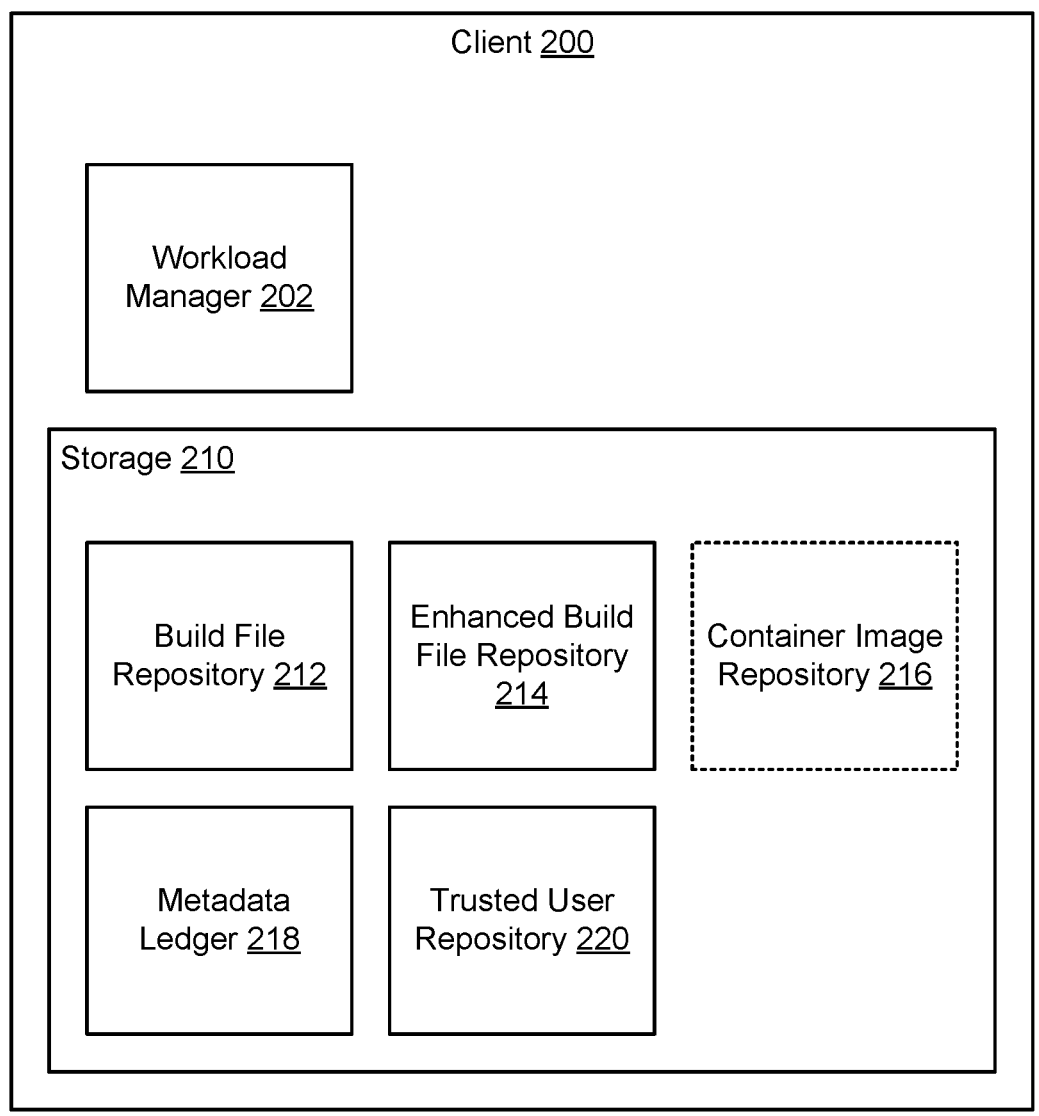
FIG. 2A shows a block diagram illustrating a client in accordance with an embodiment.

Turning to FIG. 2A, a diagram of an example client 200 in accordance with an embodiment is shown. Client 200 may be similar to any of clients 100 shown in FIG. 1. As discussed above, client 200 may facilitate the deployment of workloads based on metadata usable to authenticate and/or validate build files and/or container images prior to deployment. To provide the aforementioned functionality, client 200 may include workload deployment manager 202 and storage 210. Each of these components is discussed below.

Workload deployment manager 202 may facilitate deployments of workloads. To do so, workload deployment manager 202 may (i) obtain workload requests for workloads that may be serviced by deploying a container instance associated with a build file, (ii) using metadata associated with the build file, determine whether the build file (and/or associated container image) is an authentic build file, (iii) using the metadata associated with the build file, determine whether the build file (and/or associated container image) is trusted or untrusted, and (iv) facilitate deployment of container instances that are associated with authentic and trusted build files and prevent deployment of container instances that are not associated with authentic and/or trusted build files. By doing so, the likelihood of a compromised container image being deployed may be reduced.

To facilitate use of metadata associated with build files, workload manager 202 may generate the metadata (e.g., also referred to as "layer-level metadata blocks") as layers are added to build files. Once generated, the metadata may be chained to existing metadata to create an immutable block chain. The block chain may be maintained, for example, as part of the build files, may be added to corresponding container images, and/or may be stored in a ledger or other data structure for future use.

In an embodiment, the build files are implemented using docker files. Metadata blocks may be added to the docker files, corresponding container images, and/or ledgers as layers are added to the build files. Consequently, the metadata blocks may be used to determine whether modifications have been made (e.g., to build files, container images) after initial creation, and/or whether trusted entities added the corresponding layers to the build files. In this manner, the data structure may be validated and determined as being trusted or untrusted.

Figure 3:
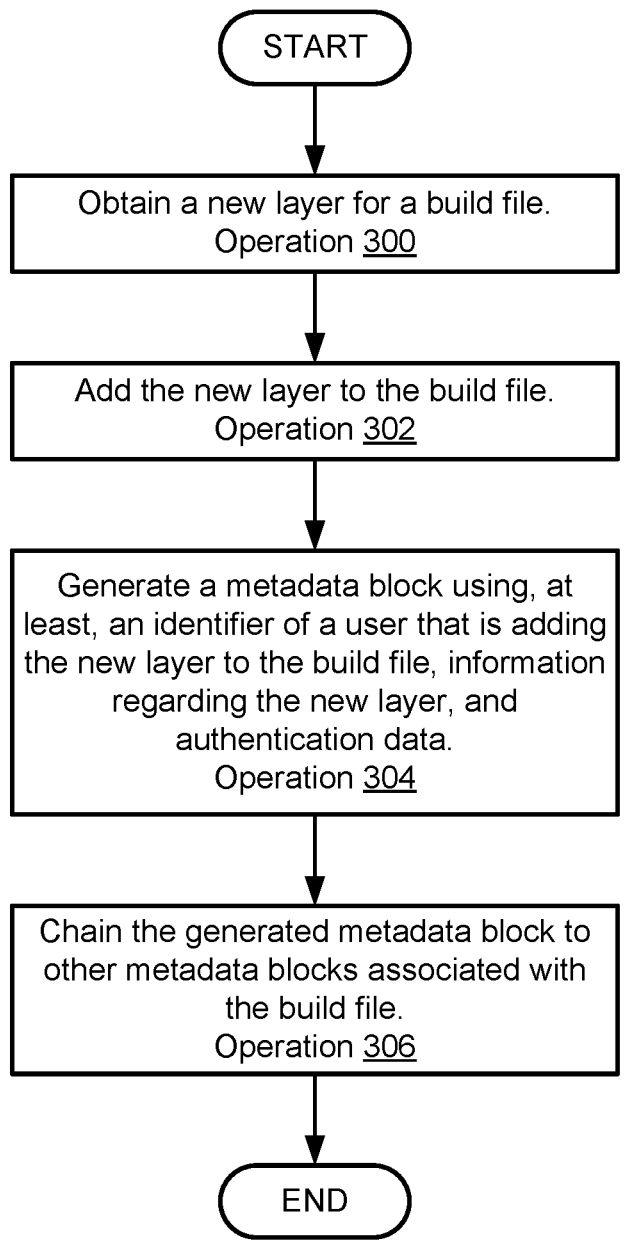
FIG. 3 shows a flow diagram illustrating a method of obtaining metadata block chains in accordance with an embodiment.
Figure 4:
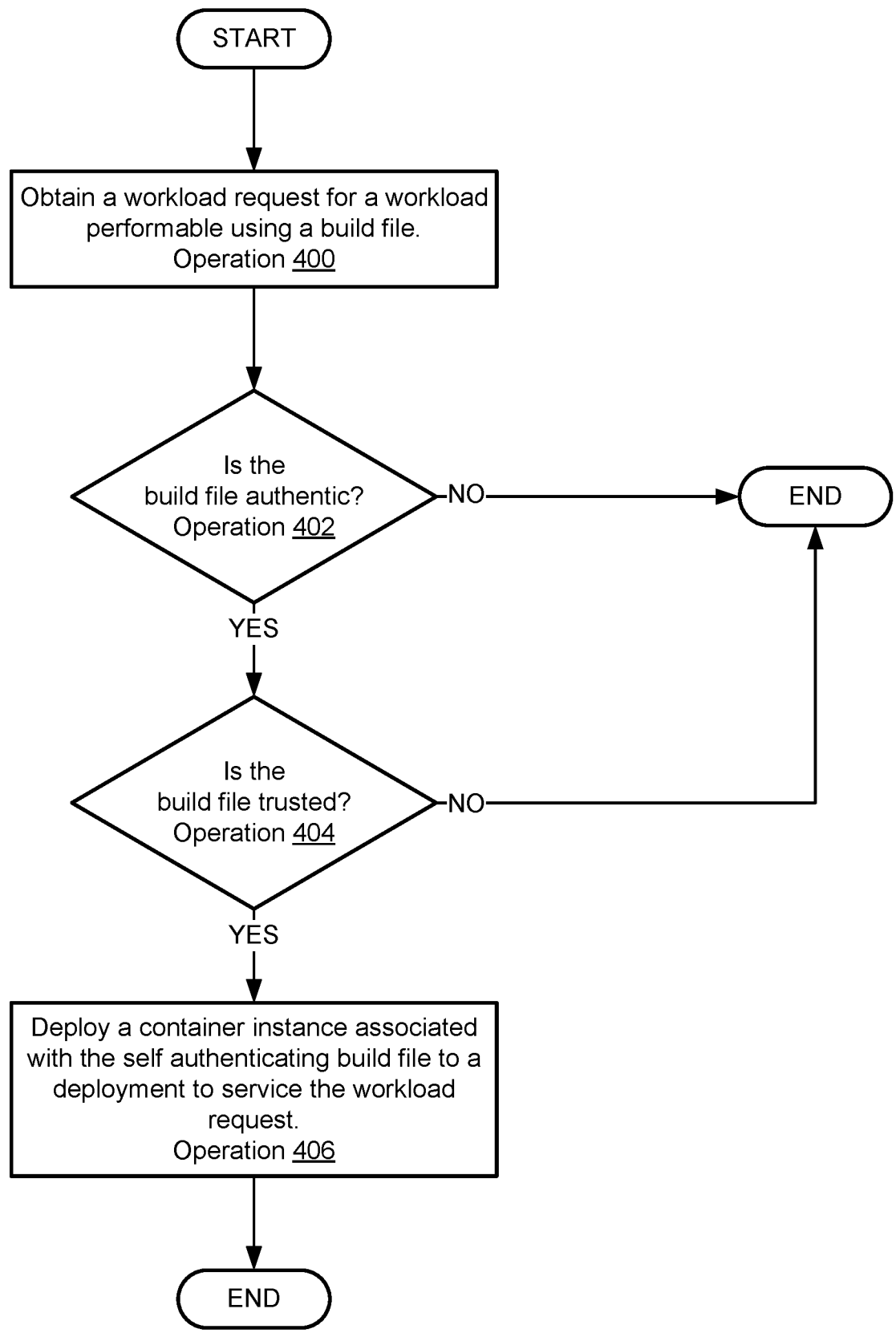
FIG. 4 is a flow diagram illustrating a method of deploying container instances in accordance with an embodiment.
Figure 5:
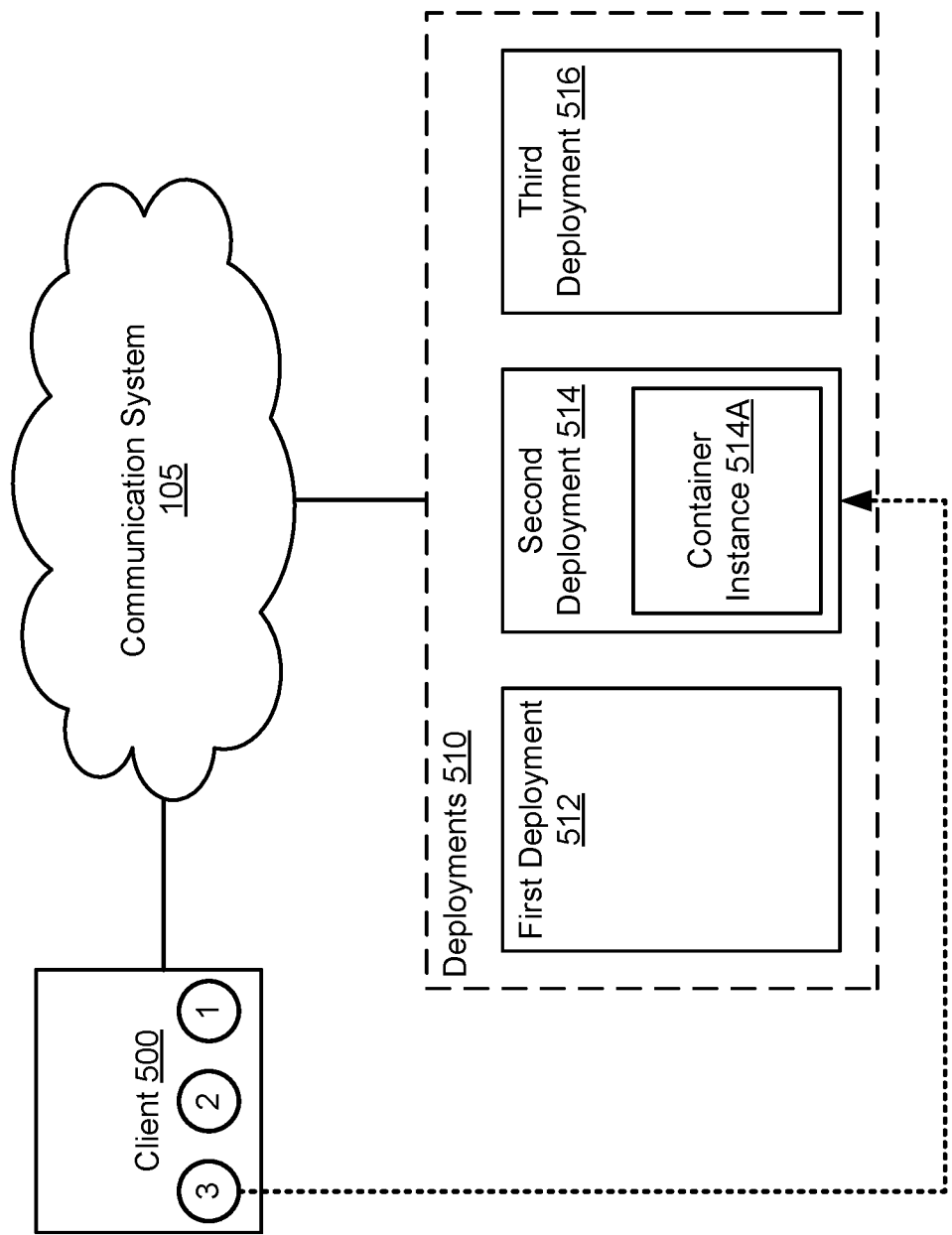
FIG. 5 shows a diagram illustrating example operations performed by an example system over time in accordance with an embodiment.
Figure 6A:
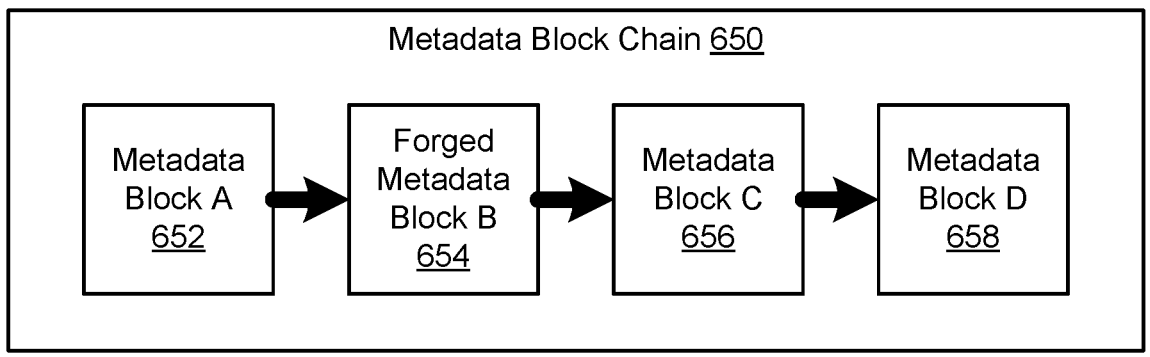
FIGS. 6A-6C show diagrams illustrating example data structures used by an example system in accordance with an embodiment.
Figure 6B:
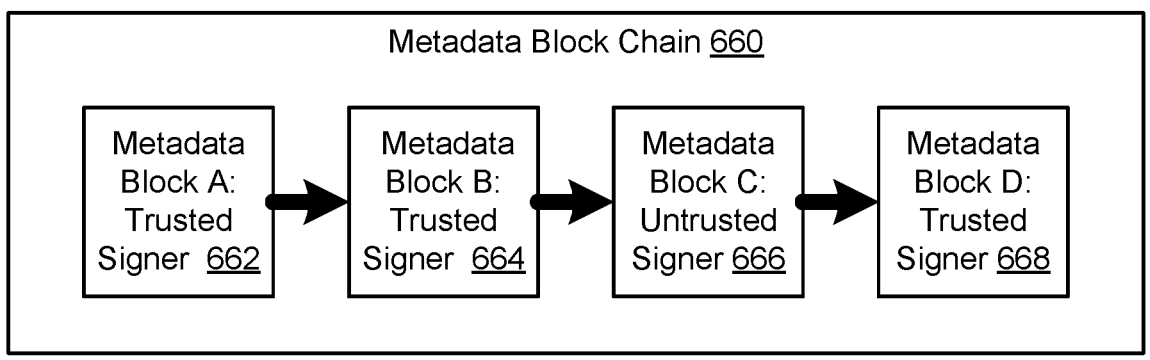
Figure 6C:
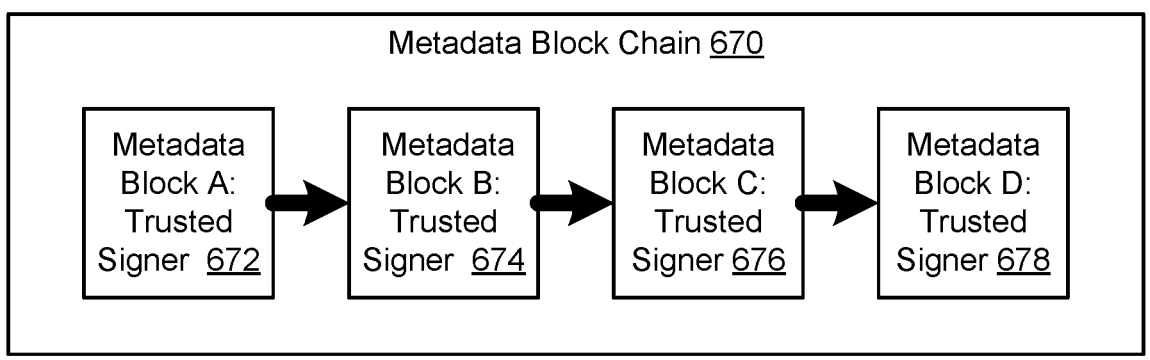

When providing its functionality, workload deployment manager 202 may perform all, or a portion, of the methods illustrated in FIGS. 3-4 and/or the operations and actions illustrated in FIGS. 5-6C.

In an embodiment, workload deployment manager 202 is implemented using a hardware device including circuitry. The hardware device may be, for example, a digital signal processor, a field programmable gate array, or an application specific integrated circuit. The circuitry may be adapted to cause the hardware device to perform the functionality of workload deployment manager 202. Workload deployment manager 202 may be implemented using other types of hardware devices without departing from embodiments disclosed herein.

In an embodiment, workload deployment manager 202 is implemented using a processor adapted to execute computing code stored on a persistent storage that when executed by the processor performs the functionality of workload deployment manager 202 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including build file repository 212, enhanced build file repository 214, container image repository 216 (drawn in FIG. 2A with a dashed outline to emphasize that client 200 may not include container image repository 216, like any other data structure illustrated in FIG. 2A), metadata ledger 218, and/or trusted user repository 220. Each of these data structures is discussed below.

Build file repository 212 may include one or more data structures that include information regarding build files, and/or copies thereof. The build files may include any number of layers which may have been added by one or more entities. Absent other data, the build files of build file repository 212 may not be authenticated or determined as being trusted or untrusted.

Figure 2B:
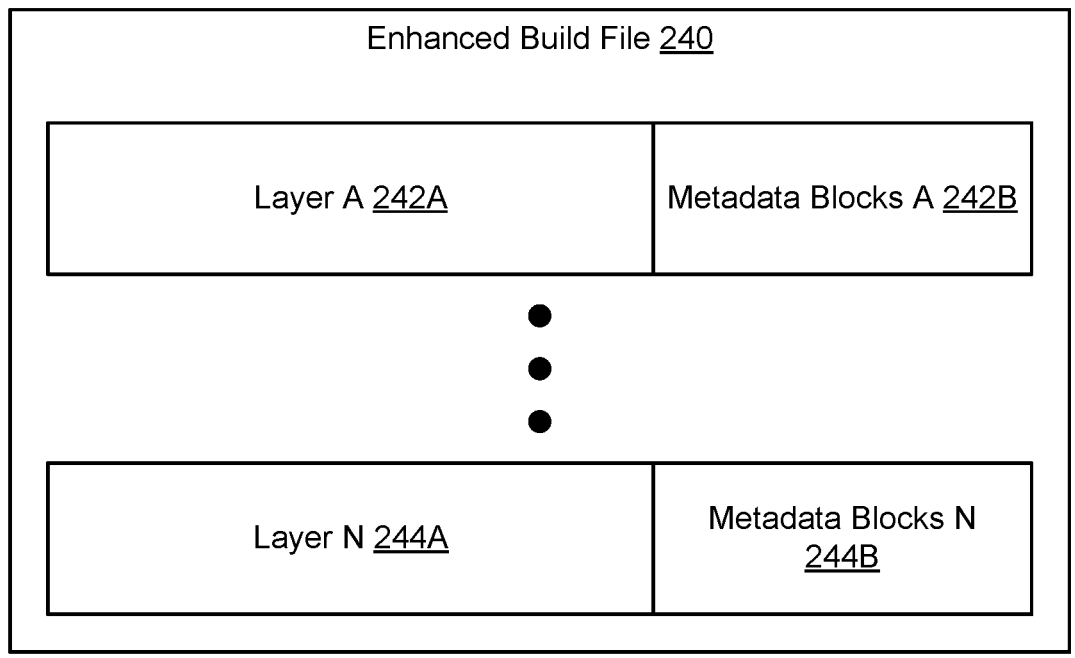
FIG. 2B shows a block diagram illustrating an enhanced build file in accordance with an embodiment.

Enhanced build file repository 214 may include one or more data structures that include information regarding build files that have been enhanced with metadata blocks, or the enhanced build files thereof. Enhanced build files may include metadata blocks that allow for the identity of the entity that added each layer to the enhanced build files to be determined, and to determine whether any of the previously added layers have been modified after being added. Refer to FIG. 2B for additional details regarding enhanced build files.

Container image repository 216 may include one or more data structures that include information regarding container images corresponding to the enhanced build files in enhanced build file repository 214. For example, container image repository 216 may include copies of container images corresponding to the enhanced build files of the enhanced build file repository. Other entities may host copies of all, or a portion, of container image repository 216. For example, deployments may host (or be operably connected to other data processing systems that host) copies of all, or a portion, of container image repository 216 thereby facilitating efficient deployment of container instances.

In an embodiment, the container images, like the enhanced build files, include similar metadata blocks allowing for validation and/or trust determination for the container images.

While build file repository 212, enhanced build file repository 214, and container image repository 216 have been described as including build files or container images, any of these repositories may include, in part or entirely, reference information for various build files and/or container images. For example, the reference information may be usable to download the build files and/or container images from other entities.

Metadata ledger 218 may include one or more data structures that include information regarding metadata blocks usable to validate and/or determine trust statuses of build files and/or corresponding container images. In an embodiment, metadata ledger 218 is implemented as a block chain where metadata blocks are chained together to form an immutable data structure. The metadata blocks may be added to the block chain using any method (e.g., consensus, proof of work, proof of interest, etc.) without departing from embodiments disclosed herein. Metadata ledger 218 may include any number of metadata block chains corresponding to any number of build files, container images, etc.

Figure 2C:
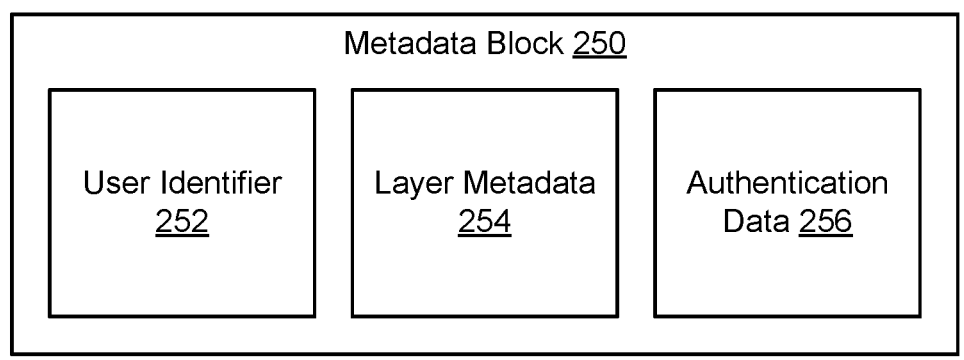
FIG. 2C shows a block diagram illustrating a metadata block in accordance with an embodiment.
Figure 2D:
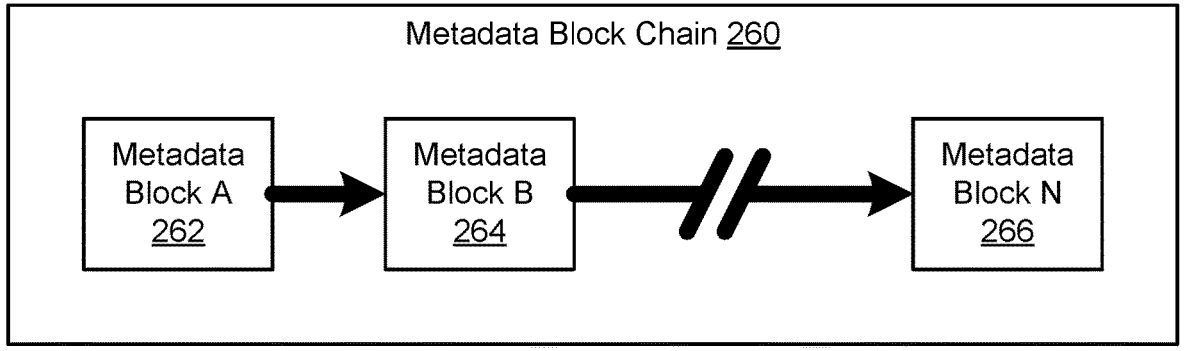
FIGS. 2D-2E show block diagrams illustrating a metadata block chain over time in accordance with an embodiment.
Figure 2E:
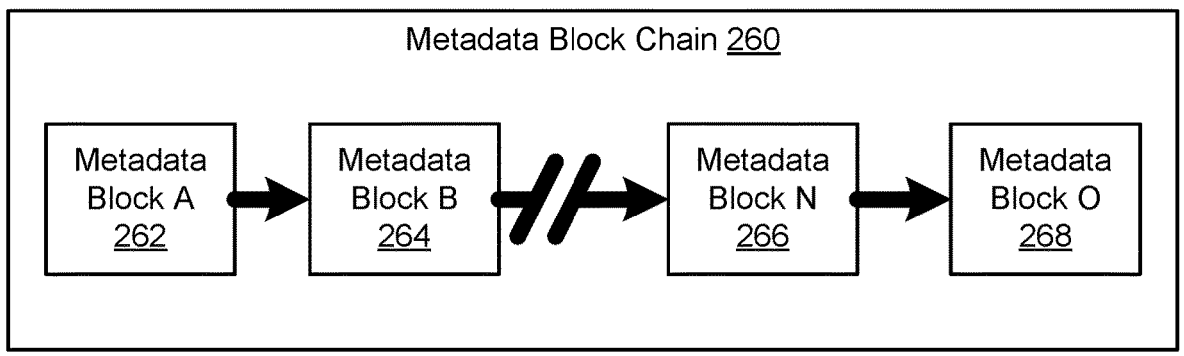

In an embodiment, the metadata block chains include a same number of blocks as a corresponding build file/container image. In other words, there may be one metadata block for each layer with information facilitating identification of the entity that added the layer and immutability of the chained metadata blocks. Refer to FIGS. 2D-2E for additional details regarding metadata blocks.

Trusted user repository 220 may include one or more data structures that include information regarding trusted entities. For example, trusted user repository 220 may include any number of identifiers of entities that are trusted. Trusted user repository 220 may be used in combination with metadata blocks to identify whether corresponding layers were added by trusted entities. If added by a trusted entity, then the corresponding layer may be trusted. A build file/container image may be trusted when all of the layers thereof are determined as being trusted.

While various data structures have been illustrated and described in FIG. 2A with specific structures, any of the data structures may be implemented with various types of structures (e.g., lists, tables, linked lists, databases, etc.), stored in different locations, may include different/less/more information than described above, and/or spanned across any number of devices without departing from embodiments disclosed herein.

While illustrated in FIG. 2A with a limited number of specific components, a client may include additional, fewer, and/or different components without departing from embodiments disclosed herein.

As discussed above, build files may be enhanced with metadata blocks to obtain enhanced build files. Turning to FIG. 2B, an example enhanced build file 240 in accordance with an embodiment is shown. Enhanced build file 240 may include metadata blocks (e.g., 242B, 244B) for each layer.

Consequently, it may be possible to efficiently identify whether a corresponding container images is validated and/or should be trusted.

For example, enhanced build file 240 may include any number of layers 242A, 244A that each specify actions to be performed to obtain a container image corresponding to enhanced build file 240. The actions may include, for example, adding various types of information to a data structure. The information may be obtained from a range of locations that may be local (e.g., stored in a local storage device) or may be stored remotely. For example, the information may include executable files, configurations, and/or other types of information that may be combined to obtain a container image.

Any of layers 242A, 244A may have been added by a same or different entity (e.g., different persons). The metadata blocks 242B, 244B corresponding to layers 242A, 244A may indicate the identity of the entity that added the layer, and may include information usable to verify that the indicated entity is accurate. Refer to FIG. 2C for additional details regarding metadata blocks.

While metadata blocks 242B, 244B are illustrated as being interleaved with layers 242A, 244A, layers 242A, 244A and metadata blocks 242B, 244B may be arranged differently (e.g., segregated from each other) without departing from embodiments disclosed herein.

However, in an embodiment, metadata blocks 242B, 244B are interleaved with layers 242A, 244A to indicate correspondence between the layers and blocks. Thus, additional metadata defining correspondence between the layers and metadata blocks may not need to be utilized thereby reducing the size of resource specific build files.

Turning to FIG. 2C, a block diagram of an example metadata block 250 in accordance with an embodiment is shown. Any of metadata data blocks 242B, 244B may be similar to metadata block 250.

Metadata block 250 may include user identifier 252, layer metadata 254, and/or authentication data 256. User identifier 252 may indicate an entity that added the corresponding layer. For example, user identifier 252 may be a name or other type of identifier.

Layer metadata 254 may include any type and quantity of metadata regarding the layer. For example, layer metadata 254 may indicate the actions indicated by the corresponding layer, and/or other types of information regarding the corresponding layer.

Authentication data 256 may include one or more cryptographic signatures (or other types of authentication data). Authentication data 256 may be usable to verify that an entity actually generated the layer. For example, authentication data 256 may include a cryptographic signature generated by a trusted processing module chip of a data processing system that added the corresponding layer.

Authentication data 256 may also include chaining data usable to determine whether a metadata block chained to metadata block 250 has been modified. For example, authentication data 256 may include a hash of the metadata block, or portions thereof, time stamps, and/or other information associated with the other metadata block to which metadata block 250 is chained. The chaining data may be a hash or other type of cryptographic data which may be generated at the time the other metadata block is generated to allow for changes to the metadata block to be identified using authentication data 256. Refer to FIGS. 2D-2E for additional details regarding chaining of data.

While various data structures have been illustrated and described in FIGS. 2A-2C with specific structures, any of the data structures may be implemented with different structures (e.g., lists, tables, linked lists, databases, etc.), stored in different locations, may include less/additional/different information than that discussed herein, and/or spanned across any number of devices without departing from embodiments disclosed herein.

As discussed above, various metadata blocks may be chained together to form an immutable data structure. FIGS. 2D-2E show diagrams of chained metadata blocks.

Turning to FIG. 2D, a diagram of metadata block chain 260 in accordance with an embodiment is shown. Metadata block chain 260 may include any number of metadata blocks (262-266) which may be similar to the metadata blocks discussed with respect to FIG. 2B-2C.

To form an immutable data structure, chaining data may be added to the metadata blocks. The chaining data of a block may allow for changes to one or more other blocks to be identified. In FIG. 2D-2E, the chaining is illustrated using over sized arrows. For example, metadata block B 264 may include a hash usable to ascertain whether metadata block A 262 has been changed. As blocks are added, chaining between individual or multiple blocks may be used.

For example, turning to FIG. 2E, a diagram illustrating the addition of metadata block O 268 to metadata block chain 260 in accordance with an embodiment is shown. When metadata block O 268 is added to metadata block chain 260, a hash of metadata block N 266 may be generated. The hash function may operate on a hash of a previous metadata block (e.g., M). Thus, the resulting hash may be based, in part, on all of the previously added blocks.

As discussed above, the components of FIG. 1 may perform various methods to service workload performance requests. FIGS. 3-4 illustrates examples of methods that may be performed by the components of FIG. 1. In the diagrams discussed below and shown in FIGS. 3-4, any of the operations may be repeated, performed in different orders, and/or performed in parallel with or a partially overlapping in time manner with other operations.

Turning to FIG. 3, a flow diagram illustrating a method of generating metadata blocks in accordance with an embodiment is shown. The method may be performed by a client or another entity.

At operation 300, a new layer for a build file is obtained. The new layer may be obtained, for example, via input from a user, from another device (e.g., via a message), or via another method. The layer for the build file may specify performance of any number of actions (e.g., obtaining configurations, applications, and/or components/information for a container image).

In an embodiment, the build file includes at least one layer. Any number of layers of the build file may have an ordering that define the order in which the actions specified by the layers are performed. The new layer may specify actions to be performed after all of the actions of the other layers have been performed.

At operation 302, the new layer is added to the build file. The new layer may be added so that its actions will be performed after the actions of the other layers of the build file (e.g., after a last layer of the build file thereby making the newly added layer the last layer to be performed when a container image is generated using the build file).

At operation 304, a metadata block is generated. The metadata block may be for the newly added layer. The metadata block may be generated using (i) an identifier of a user (or other entity) that is adding the new layer to the build file, (ii) information regarding the new layer (e.g., layer metadata), and (iii) authentication data. The metadata block may be similar to that illustrated in FIG. 2C.

At operation 306, the generated metadata block is chained to other metadata blocks associated with the build file. For example, the generated metadata block may be appended to a block chain. The generated metadata block may be chain to the last block in the block chain. In an embodiment, the block chain has a number of blocks corresponding to the number of layers of the build file, and the blocks of the block chain may have an ordering that is similar to the ordering of the layers in the block chain. Consequently, there may be a correspondence between the metadata blocks in the block chain and the layers in the build file.

In an embodiment, the block chain is maintained in a distributed ledger. Any number of clients may have access to copies of the distributed ledger.

The method may end following operation 306.

Turning to FIG. 4, a flow diagram illustrating a method of deploying a workload in accordance with an embodiment is shown. The method may be performed by a client or another entity.

At operation 400, a workload request for a workload performable using a build file is obtained. The build file (or associated container image) may be usable to deploy a container instance that will perform the workload.

The workload request may specify, for example, the type of workload to be performed. The type of workload to be performed may be used to identify the build file (e.g., build files may be associated with different workload types).

At operation 402, a determination is made regarding whether the build file is authentic. The determination may be made by evaluating each of the blocks in a metadata block chain corresponding to the build file. The blocks may be evaluated by using hashes or other cryptographic information stored in the metadata blocks. If all of the blocks are able to be authenticated using the cryptographic information, then it may be determined that the build file is authentic. Otherwise, the build file may be treated as being unauthentic.

If it is determined that the build file is not authentic, then the method may end following operation 402. Otherwise, the method may proceed to operation 404 following operation 402.

At operation 404, a determination is made regarding whether the build file is trusted. The build file may be trusted if authentication data and/or entity identifiers stored in the metadata blocks of the block chain associated with the build file indicate that each layer (e.g., corresponding to a respective metadata block) was added to the build file by a trusted entity. The determination may be made by (i) comparing the entity identifiers to those of trusted entities to attempt to fine a match (lack of a match may indicate that the corresponding layer is not to be trusted) and (ii) using the authentication data in each respective metadata data block to validate that the metadata block was, in fact, added by the entity identified by the entity identifier. For example, a unilateral or bilateral authentication process may be performed using the authentication data (or through a third, intermediate entity such as an authentication service). If all of the metadata blocks are indicated to be added by a trusted entity and can be authenticated, then the build file may be trusted. Otherwise, the build file may not be trusted.

If the build file is trusted, the method may proceed to operation 406. Otherwise, the method may end following operation 404.

At operation 406, a container instance associated with the build file is deployed to a deployment to service the workload. To deploy the container instance, the client may instruct the one of the deployments to deploy the container instance. The instructed deployment may then deploy the container instance by instantiating the corresponding user space, populating it with corresponding data, loading instructions into memory, and/or initiating execution of the instructions to begin execution of the container instance.

The method may end following operation 406.

Using the methods illustrated in FIGS. 3-4, embodiments disclosed herein may facilitate deployment of container instances that are more likely to perform as expected.

To further clarify embodiments disclosed herein, FIG. 5 shows a diagram in accordance with an embodiment disclosed herein illustrating example operation of a system similar to that shown in FIG. 1 over time. FIGS. 6A-6C illustrate diagrams in accordance with an embodiment disclosed herein of example data structures that may be utilized by components of the system illustrated in FIG. 5.

Turning to FIG. 5, consider an example scenario where client 500 is operably connected to deployments 510 via communication system 105. Client 500 may be capable of deploying container instances to any of deployments 510.

At a first point in time, client 500, at block 1, receives a request for a workload that may be serviced by a first build file (e.g., by deploying a container instance based on the first build file). However, client 500 may not know whether first build file should be trusted.

Turning to FIG. 6A, a diagram of metadata block chain 650 in accordance with an embodiment is shown. FIG. 6A represent the state of metadata block chain 650 at a first point in time. As seen in FIG. 6A, metadata block chain 650 includes forged metadata block B 654 which was modified from an original metadata block. The forged metadata block B 654 indicates that a trusted entity added the layer corresponding to forged metadata block B to the first build file.

Prior to deploying a container instance, client 500 first attempts to validate metadata block chain 650 by sequentially using the cryptographic information linking each of the blocks to ascertain when one of the blocks has been changed. To do so, client 500 calculates a hash for each block and compares it to the cryptographic information in the subsequent metadata block. In this case, when client 500 compares the generated cryptographic information for forged metadata block B 654 to that included in metadata block C 656, a difference is identified that indicates that forged metadata block B 654 is not authentic. Accordingly, client 500 may not deploy a container instance based on the first build file.

Overtime, the first build file is updated and the corresponding metadata block chain is updated, as shown in FIG. 6B. As seen in FIG. 6B, the forged metadata block B 664 has been replaced with a normal metadata block.

Returning to the discussion of FIG. 5, at a second point in time, client 500, at block 2, receives a request for a workload that may be serviced by the first build file (e.g., by deploying a container instance based on the first build file). Because the first build file and corresponding metadata block chain have been updated, all of the metadata blocks pass validation. However, client 500 may not know whether first build file should be trusted.

Turning to FIG. 6B, a diagram of metadata block chain 650 in accordance with an embodiment is shown. FIG. 6B represent the state of metadata block chain 650 at the first point in time. As seen in FIG. 6B, metadata block chain 650 includes metadata block C 666 that was added by an untrusted signer.

Prior to deploying a container instance, client 500 (e.g., after validating the metadata blocks) attempts to ascertain whether metadata block chain 650 should be trusted by comparing the identifiers of entities that added each blocks to trusted entities. In this case, when client 500 compares the entity identifier of metadata block C 656 to its list of trusted entities, client 500 identifies that the block (and corresponding layer) were added by an untrusted entity. Accordingly, client 500 may not deploy a container instance based on the first build file even though all of the corresponding metadata blocks may be validated.

Overtime, the first build file is further updated and the corresponding metadata block chain is updated, as shown in FIG. 6C. As seen in FIG. 6C, the metadata block C 666 has been replaced with a metadata block C 666 that is indicated to be added by a trusted entity (e.g., signed by a trusted entity).

Returning to the discussion of FIG. 5, at a third point in time, client 500, at block 3, receives a request for a workload that may be serviced by the first build file (e.g., by deploying a container instance based on the first build file). Because the first build file and corresponding metadata block chain have been further updated, all of the metadata blocks pass validation and all of the metadata blocks are trusted.

Consequently, client 500 instructs second deployment 514 to deploy a container instance based on the first build file. Based on the instructions, second deployment 514 deploys container instance 514A based on the first build file. Once deployed, container stance 514A performs the requested workload.

Figure 7:
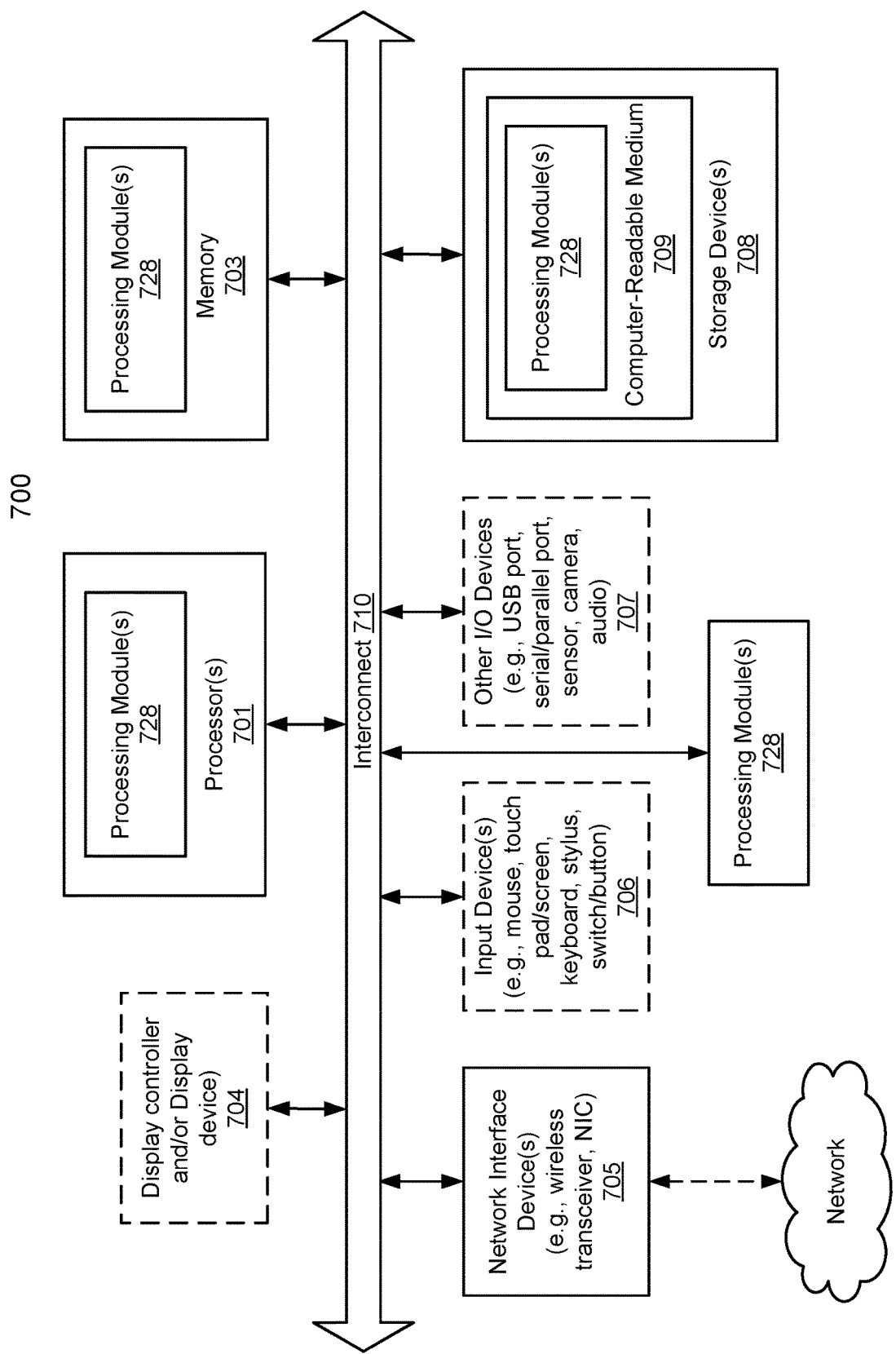
FIG. 7 shows a block diagram illustrating a data processing system in accordance with an embodiment.

Any of the components illustrated in FIGS. 1-6C may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing workloads to be performed using deployments, the method comprising:
    obtaining a new workload request for a workload to be performed with a data processing system of the deployments and a build file;
    making a determination that layer-level metadata blocks associated with the build file indicate that all of the layers of the build file are authentic, wherein each of the layer-level metadata blocks corresponds to a layer of the build file, and an ordering of the layer-level metadata blocks corresponding to an ordering of the layers of the build file; and
    based on the determination:
    making a second determination that the layer-level metadata blocks associated with the build file indicate that all of the layers of the build file are trusted;
    based on the second determination:
    deploying a container instance associated with the build file to a deployment of the deployments to service the workload request.

2. The computer-implemented method of claim 1, wherein the layer-level metadata blocks are stored as an immutable blockchain.

3. The computer-implemented method of claim 2, wherein making the determination comprises verifying that that chaining of each of the layer-level metadata blocks indicates that none of the layer-level metadata blocks have been altered.

4. The computer-implemented method of claim 1, wherein one of the layer-level metadata blocks comprises:
    an identifier of an entity that added the layer to the build file,
    wherein making the second determination comprises comparing the identifier of the entity to a list of identifiers of trusted entities to determine that the entity is trusted.

5. The computer-implemented method of claim 4, wherein one of the layer-level metadata blocks further comprises:
    a cryptographic fingerprint,
    wherein making the second determination further comprises authenticating the one of the layer-level metadata blocks as being from the identified entity using the cryptographic fingerprint.

6. The computer-implemented method of claim 5, wherein the cryptographic fingerprint is generated using a trusted platform module of a data processing device operated by the entity that added the layer to the build file.

7. The computer-implemented method of claim 5, wherein one of the layer-level metadata blocks further comprises:
    information regarding an associated layer of the build file, the layer defining one or more actions to be performed to generate, in part, a container image corresponding to the build file,
    wherein information regarding the associated layer indicates one or more commands invoked by the layer when generating the container image.

8. The computer-implemented method of claim 1, further comprising:
    prior to obtaining the workload request:
    obtaining a second build file;
    adding a layer to the second build file to obtain the build file;
    generating a layer-level metadata block corresponding to the added layer;
    chaining the layer-level metadata block to second layer-level metadata blocks associated with the second build file to obtain the layer-level metadata blocks.

9. The computer-implemented method of claim 8, wherein generating the layer-level metadata block comprises:
    adding:
    an identifier of an entity that added the layer to the second build file to a new layer-level metadata block;
    information regarding actions specified by the layer; and
    a cryptographic signature associated with the entity.

10. The computer-implemented method of claim 9, wherein chaining the layer-level metadata block to the second layer-level metadata blocks comprises:
    generating a second cryptographic signature of a most recently added layer-level metadata block of the second layer-level metadata blocks; and
    adding the second cryptographic signature to the layer-level metadata block.

11. A non-transitory machine-readable medium having instructions stored therein, which when executed by a processor, cause the processor to perform operations for managing workloads to be performed using deployments, the operations comprising:
    obtaining a new workload request for a workload to be performed with a data processing system of the deployments and a build file;
    making a determination that layer-level metadata blocks associated with the build file indicate that all of the layers of the build file are authentic, wherein each of the layer-level metadata blocks corresponds to a layer of the build file, and an ordering of the layer-level metadata blocks corresponding to an ordering of the layers of the build file; and
    based on the determination:
    making a second determination that the layer-level metadata blocks associated with the build file indicate that all of the layers of the build file are trusted;
    based on the second determination:
    deploying a container instance associated with the build file to a deployment of the deployments to service the workload request.

12. The non-transitory machine-readable medium of claim 11, wherein the layer-level metadata blocks are stored as an immutable block chain.

13. The non-transitory machine-readable medium of claim 12, wherein making the determination comprises verifying that that chaining of each of the layer-level metadata blocks indicates that none of the layer-level metadata blocks have been altered.

14. The non-transitory machine-readable medium of claim 11, wherein one of the layer-level metadata blocks comprises:
    an identifier of an entity that added the layer to the build file,
    wherein making the second determination comprises comparing the identifier of the entity to a list of identifiers of trusted entities to determine that the entity is trusted.

15. The non-transitory machine-readable medium of claim 14, wherein one of the layer-level metadata blocks further comprises:
    a cryptographic fingerprint,
    wherein making the second determination further comprises authenticating the one of the layer-level metadata blocks as being from the identified entity using the cryptographic fingerprint.

16. A data processing system, comprising:
    a processor; and
    a memory coupled to the processor to store instructions, which when executed by the processor, cause the processor to perform operations for managing workloads to be performed using deployments, the operations comprising:
    obtaining a new workload request for a workload to be performed with a data processing system of the deployments and a build file;
    making a determination that layer-level metadata blocks associated with the build file indicate that all of the layers of the build file are authentic, wherein each of the layer-level metadata blocks corresponds to a layer of the build file, and an ordering of the layer-level metadata blocks corresponding to an ordering of the layers of the build file; and
    based on the determination:
    making a second determination that the layer-level metadata blocks associated with the build file indicate that all of the layers of the build file are trusted;
    based on the second determination:
    deploying a container instance associated with the build file to a deployment of the deployments to service the workload request.

17. The data processing system of claim 16, wherein the layer-level metadata blocks are stored as an immutable block chain.

18. The data processing system of claim 17, wherein making the determination comprises verifying that that chaining of each of the layer-level metadata blocks indicates that none of the layer-level metadata blocks have been altered.

19. The data processing system of claim 16, wherein one of the layer-level metadata blocks comprises:
    an identifier of an entity that added the layer to the build file,
    wherein making the second determination comprises comparing the identifier of the entity to a list of identifiers of trusted entities to determine that the entity is trusted.

20. The data processing system of claim 19, wherein one of the layer-level metadata blocks further comprises:
    a cryptographic fingerprint,
    wherein making the second determination further comprises authenticating the one of the layer-level metadata blocks as being from the identified entity using the cryptographic fingerprint.

* * * * *